US010673851B2

(12) United States Patent
Liang et al.

(10) Patent No.: US 10,673,851 B2
(45) Date of Patent: Jun. 2, 2020

(54) METHOD AND DEVICE FOR VERIFYING A TRUSTED TERMINAL

(71) Applicant: ALIBABA GROUP HOLDING LIMITED, George Town, Grand Cayman (KY)

(72) Inventors: Jianguo Liang, Zhejiang (CN); Peiling Jiang, Zhejiang (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 137 days.

(21) Appl. No.: 15/495,894

(22) Filed: Apr. 24, 2017

(65) Prior Publication Data

US 2017/0230366 A1   Aug. 10, 2017

Related U.S. Application Data

(63) Continuation of application No. PCT/CN2015/091694, filed on Oct. 10, 2015.

(30) Foreign Application Priority Data

Oct. 24, 2014 (CN) .......................... 2014 1 0579074

(51) Int. Cl.
*H04L 29/06* (2006.01)
*G06F 21/31* (2013.01)
*H04L 9/32* (2006.01)

(52) U.S. Cl.
CPC ........ *H04L 63/0876* (2013.01); *G06F 21/316* (2013.01); *H04L 9/32* (2013.01);
(Continued)

(58) Field of Classification Search
CPC ..... H04L 63/0876; H04L 9/32; H04L 63/102; H04L 63/104; H04L 63/105; H04L 63/107; H04L 63/126
(Continued)

(56) References Cited

U.S. PATENT DOCUMENTS

| 7,174,454 B2* | 2/2007 | Roskind | G06F 21/316 |
| | | | 705/66 |
| 8,495,716 B1* | 7/2013 | Newstadt | H04L 63/0884 |
| | | | 713/182 |

(Continued)

FOREIGN PATENT DOCUMENTS

| CN | 101674183 A | 3/2010 |
| CN | 102047709 A | 5/2011 |

(Continued)

OTHER PUBLICATIONS

PCT International Search Report dated Jan. 15, 2016 issued in corresponding International Application No. PCT/CN2015/091694 (7 pages).

(Continued)

*Primary Examiner* — Taghi T Arani
*Assistant Examiner* — Badri Narayanan Champeksan
(74) *Attorney, Agent, or Firm* — Finnegan, Henderson, Farabow, Garrett & Dunner LLP (57) ABSTRACT

Embodiments of the disclosure provide a method for verifying a trusted terminal, including: determining whether a login terminal of a user matches the trusted terminal of the user recorded locally; determining, when it is determined that the login terminal does not match the trusted terminal of the user recorded locally, whether a login account of the user is associated with a frequent-use login account of the login terminal; and determining that the login terminal is the trusted terminal of the user if Yes. By means of solutions of the disclosure, in an application scenario of a login terminal being exchanged between users, repetitively performing complicated verifying on the login terminal may be avoided.

12 Claims, 6 Drawing Sheets

(52) U.S. Cl.
CPC .......... *H04L 63/102* (2013.01); *H04L 63/104* (2013.01); *H04L 63/105* (2013.01); *H04L 63/107* (2013.01); *H04L 63/126* (2013.01); *G06F 2221/2129* (2013.01); *G06F 2221/2135* (2013.01)

(58) Field of Classification Search
USPC ............................................................ 726/7
See application file for complete search history.

(56) References Cited

U.S. PATENT DOCUMENTS

| | | | | |
|---|---|---|---|---|
| 8,627,438 | B1* | 1/2014 | Bhimanaik | H04L 63/10 726/9 |
| 8,800,003 | B2* | 8/2014 | Guo | H04L 9/3234 726/4 |
| 8,856,894 | B1* | 10/2014 | Dean | H04L 63/08 713/175 |
| 8,863,243 | B1* | 10/2014 | Lidzborski | H04W 12/06 726/4 |
| 8,955,078 | B2* | 2/2015 | Hoggan | H04L 9/3263 726/8 |
| 9,807,059 | B2* | 10/2017 | Stahl | H04L 12/1403 |
| 2005/0015628 | A1* | 1/2005 | Narayanan | G06F 21/31 726/19 |
| 2005/0097320 | A1* | 5/2005 | Golan | G06F 21/40 713/166 |
| 2010/0199338 | A1* | 8/2010 | Craddock | G06F 21/31 726/7 |
| 2010/0268557 | A1* | 10/2010 | Faith | G06Q 30/0201 705/7.29 |
| 2011/0010134 | A1* | 1/2011 | Balla | G06F 30/13 703/1 |
| 2011/0119771 | A1* | 5/2011 | Postoyko | G06F 21/6209 726/28 |
| 2011/0247055 | A1* | 10/2011 | Guo | H04L 9/3263 726/4 |
| 2012/0167162 | A1* | 6/2012 | Raleigh | H04L 41/046 726/1 |
| 2013/0145440 | A1* | 6/2013 | Adam | G06F 21/40 726/5 |
| 2013/0232541 | A1* | 9/2013 | Kapadia | G06F 21/33 726/1 |
| 2013/0318573 | A1* | 11/2013 | Reunamaki | H04W 12/04 726/4 |
| 2014/0223525 | A1* | 8/2014 | Fadida | H04L 63/083 726/6 |
| 2015/0013000 | A1* | 1/2015 | Linnakangas | H04L 63/08 726/14 |
| 2015/0089568 | A1* | 3/2015 | Sprague | H04L 63/0876 726/1 |
| 2016/0087952 | A1* | 3/2016 | Tartz | H04W 12/06 455/411 |
| 2017/0230362 | A1* | 8/2017 | Wang | H04L 63/107 |

FOREIGN PATENT DOCUMENTS

| | | |
|---|---|---|
| CN | 103001826 A | 3/2013 |
| JP | 2008059222 A | 3/2008 |
| JP | 2008242889 A | 10/2008 |
| JP | 2011522327 A | 7/2011 |

OTHER PUBLICATIONS

Office Action issued from the Japanese Patent Office in corresponding Japanese Application No. 2017-521133, dated Jun. 12, 2019 (9 pgs.).

* cited by examiner

METHOD AND DEVICE FOR VERIFYING A TRUSTED TERMINAL

CROSS REFERENCE TO RELATED APPLICATION

The disclosure claims the benefits of priority to International Application No. PCT/CN2015/091694, filed on Oct. 10, 2015, which claims the benefits of priority to Chinese Application No. 201410579074.5, filed Oct. 24, 2014, both of which are incorporate herein in their entireties.

TECHNICAL FIELD

The disclosure relates to the field of terminal technologies, and in particular, to methods and devices for verifying a trusted terminal.

BACKGROUND

For some applications that require a greater amount of security, when a user needs to perform sensitive operations, such as resetting a password, modifying a contact phone number reserved by the user, or modifying a login name, the modified information involved in the sensitive operations is mostly the user's private information. Therefore, a process for verifying an identity of the user would be very strict when the user performs the sensitive operations.

For example, when the user performs the sensitive operations, the user may upload credential information and answer a reserved question generated on a webpage. Then a customer service staff manually reviews the credential information uploaded by the user and makes a follow-up phone call. Only after all the above verifications are passed, may the user be permitted to perform the above sensitive operations.

In the above solution, however, if all users need to perform the above strict process for identifying identities while performing the sensitive operations, reviewing credentials uploaded by the users and making follow-up phone calls both require a significant labor cost. Moreover, if the user have to perform a relatively strict identity verifying again for every sensitive operation, user experience may be influenced.

In order to address the above problems, a login terminal used by the user may be verified, the login terminal that is verified is a trusted terminal for the user. When the user uses the trusted terminal to log in and perform a sensitive operation, repeated verification may not necessarily be performed on the user, or only relatively simple verification may be performed.

Generally, a login terminal of a user is verified by transaction information, an IP address, and a login time period of the user. But, in some special application scenarios, for example, when a login terminal is exchanged between users, the above method cannot meet user demands.

SUMMARY

To address the above problems, the present disclosure provides a method and a device for verifying a trusted terminal.

According to a first aspect of embodiments of the disclosure, a method for verifying a trusted terminal is provided, including: determining whether a login terminal of a user matches the trusted terminal of the user recorded locally; determining, when it is determined that the login terminal does not match the trusted terminal of the user recorded locally, whether a login account of the user is associated with a frequent-use login account of the login terminal; and determining that the login terminal is the trusted terminal of the user if the login account of the user is associated with the frequent-use login account of the login terminal.

Optionally, before determining whether a login terminal of a user matches a trusted terminal of the user recorded locally, the method further includes: identifying a terminal type of the trusted terminal according to hardware information of the trusted terminal; locally classifying the trusted terminal as a handheld trusted terminal when the trusted terminal is identified as a handheld terminal; determining whether a frequent-use time period of the trusted terminal is an office time period or a household time period, when the trusted terminal is identified as a PC terminal; locally classifying the trusted terminal as an office trusted terminal, when the frequent-use time period of the trusted terminal is the office time period; and locally classifying the trusted terminal as a household trusted terminal, when the frequent-use time period of the trusted terminal is the household time period.

Optionally, before determining whether a login account of the user is associated with a frequent-use login account of the login terminal, the method further include: determining whether the number of logins of the login account of the user on the login terminal reaches a threshold; further determining whether the login account of the user is associated with the frequent-use login account of the login terminal, if the number of logins of the login account of the user on the login terminal reaches the threshold; and determining that the login terminal is an untrusted terminal of the user, if the login account of the user is not associated with the frequent-use login account of the login terminal.

Optionally, determining whether a login account of the user is associated with a frequent-use login account of the login terminal include: querying the frequent-use login account of the login terminal, wherein the frequent-use login account is, among historical login accounts of the login terminal, a login account that the number of logins thereof reaches a threshold; determining whether the login account of the user and the frequent-use login account were logged-in on a same trusted terminal and whether the numbers of logins of both of the two accounts reach the threshold; and if the login account of the user and the frequent-use login account were logged-in on the same trusted terminal and the numbers of logins of both of the two accounts reach the threshold, determining that the login account of the user is associated with the frequent-use login account, and locally storing an association relationship between the login account of the user and the historical login accounts.

Optionally, the same trusted terminal is the same household trusted terminal.

According to a second aspect of embodiments of the disclosure, a device for verifying a trusted terminal is provided, including: a first determining module, used for determining whether a login terminal of a user matches a trusted terminal recorded locally; and a second determining module, used for determining, when it is determined that the login terminal does not match the trusted terminal recorded locally, whether a login account of the user is associated with a frequent-use login account of the login terminal, and determine that the login terminal is the trusted terminal of the user if the login account of the user is associated with the frequent-use login account of the login terminal.

Optionally, the device further includes: a classification module, used for identifying, before the first determining module determines whether a login terminal of a user matches a trusted terminal of the user recorded locally, a terminal type of the trusted terminal according to hardware information of the trusted terminal; when the trusted terminal is identified as a handheld terminal, locally classifying the trusted terminal as a handheld trusted terminal; when the trusted terminal is identified as a PC terminal, determining whether a common time period of the trusted terminal is an office time period or a household time period; when the common time period of the trusted terminal is the office time period, locally classifying the trusted terminal as an office trusted terminal; and when the common time period of the trusted terminal is the household time period, locally classifying the trusted terminal as a household trusted terminal.

Optionally, the second determining module is further used for: determining, before determining whether a login account of the user is associated with a frequent-use login account of the login terminal, whether the number of logins of the login account of the user on the login terminal reaches a threshold; further determining whether the login account of the user is associated with the frequent-use login account of the login terminal if the number of logins of the login account of the user on the login terminal reaches the threshold; and determining that the login terminal is an untrusted terminal of the user if the login account of the user is not associated with the frequent-use login account of the login terminal.

Optionally, the second determining module is further used for: querying the frequent-use login account of the login terminal, wherein the frequent-use login account is, among historical login accounts of the login terminal, a login account that the number of logins thereof reaches a threshold; determining whether the login account of the user and the frequent-use login account were logged-in on a same trusted terminal and whether the numbers of logins of both of the two accounts reach the threshold; and if the login account of the user and the frequent-use login account were logged-in on the same trusted terminal and the numbers of logins of both of the two accounts reach the threshold, determining that the login account of the user is associated with the frequent-use login account, and locally store an association relationship between the login account of the user and the historical login accounts.

Optionally, the same trusted terminal is the same household trusted terminal.

According to a third aspect of embodiments of the disclosure, a device for verifying a trusted terminal is provided, including: a processor; and a memory for storing instructions executable by the processor; wherein the processor is used for: determining whether a login terminal of a user matches a trusted terminal of the user recorded locally; determining, when it is determined that the login terminal does not match the trusted terminal of the user recorded locally, whether a login account of the user is associated with a frequent-use login account of the login terminal; and determining that the login terminal is the trusted terminal of the user if the login account of the user is associated with the frequent-use login account of the login terminal.

In view of this, the disclosure, based on the conventional technical solution of verifying a login terminal, determines an association relationship between a login account and a frequent-use login account of the login terminal in a process of verifying the login terminal. When it is determined that the login account of a user is associated with the frequent-use login account of the login terminal, the login terminal is determined as a trusted terminal of the user. By means of the above solution, in an application scenario of a login terminal being exchanged between users, repetitively performing complicated verifying on the login terminal may be avoided.

DETAILED DESCRIPTION

Exemplary embodiments will be described in detail herein, and examples thereof are shown in the accompanying drawings. In the following description involving the accompanying drawings, the same numerals in different accompanying drawings indicate the same or similar elements, unless specified otherwise. Implementations described in the following exemplary embodiments do not represent all implementations consistent with the disclosure. In contrast, they are merely examples of devices and methods consistent with some aspects of the disclosure as described in detail in the appended claims.

Terms in the disclosure are merely used for describing specific embodiments, rather than limiting the disclosure. Singular forms "a (an)", "said", and "the" used in the present disclosure and the appended claims also include plural forms, unless clearly specified in the context that other meanings are denoted. It should be further understood that the term "and/or" used herein refers to and includes any or all possible combinations of one or more associated items listed.

It should be understood that, although terms such as "first", "second", and "third" may be used to describe various kinds of information in the disclosure, these kinds of information should not be limited by the terms. These terms are merely used to distinguish information of the same type from each other. For example, without departing from the scope of the disclosure, the first information may also be referred to as second information, and similarly, the second information may also be referred to as first information. Depending on the context, the word "if" used herein may be explained as "when . . . ", "as . . . ", or "in response to the determination".

For an application scenario where a login terminal is exchanged between users to log in to a payment account, generally, login terminals of all users are verified respectively by a server in combination with hardware information of the login terminals; after the verification is successful, the server locally records the login terminal as a trusted terminal of the user; and when the user uses the trusted terminal to perform a sensitive operation, repetitive verifying is not performed on the login terminal of the user, or merely simple verification is performed.

However, the above solution may have issues as described below.

For example, in an application scenario of a common login terminal being used among family members to log in to a payment account, when the login terminal is verified according to the above method, verifying is generally based on login information of the user, such as transaction information, an IP address, a login time period, and the like of the user. Thus, the server will verify the login terminal for different family members one by one when different family members use the same login terminal to log in to their own payment accounts.

Generally, however, as the degree of trust among family members is high, it is completely unnecessary that the server verifies the login terminal for different family members one by one when the family members use the same login terminal to log in to their own payment accounts.

In view of this, the disclosure, based on the technical solution of verifying a login terminal, determines an association relationship between a login account and a frequent-use login account of the login terminal in a process of verifying the login terminal. When it is determined that the login account of a user is associated with the frequent-use login account of the login terminal, the login terminal is determined as a trusted terminal of the user.

The solution achieves that, in an application scenario of a login terminal being exchanged between users, whether the login terminal is a trusted terminal of the user can be determined by an association relationship between the login account of the user and the frequent-use login account of the login terminal, thereby avoiding repetitively performing complicated verifying on the login terminal.

The disclosure will be described below through specific embodiments and in combination with different examples.

Figure 1:
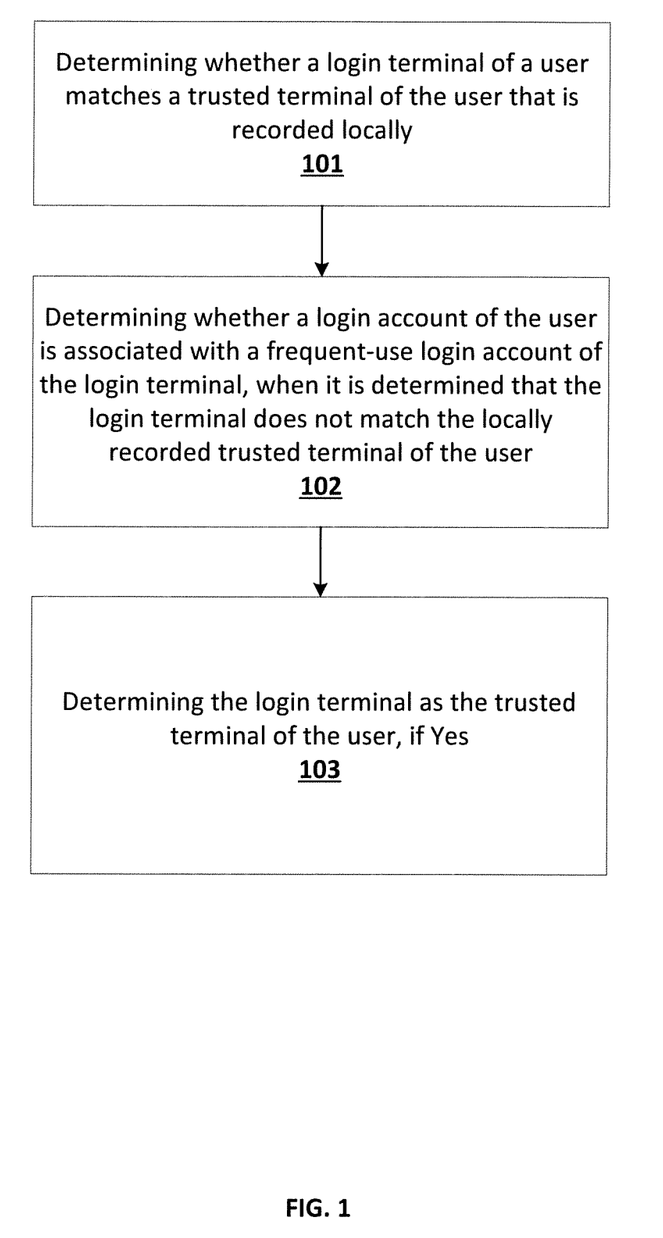
FIG. 1 is a flow chart of a method for verifying a trusted terminal, according to embodiments of the disclosure.

Referring to FIG. 1, FIG. 1 is a method for verifying a trusted terminal according to embodiments of the disclosure. The method may be performed by a server, and the method includes the following steps 101-103.

In step 101, whether a login terminal of a user matches a trusted terminal of the user that is recorded locally may be determined.

In the step, during determining whether the login terminal of the user is a trusted terminal of the user, the server may acquire hardware information of the login terminal and then sequentially match the hardware information of the terminal with hardware information of the trusted terminal of the user recorded in a database. And if they are matched, it indicates that the login terminal is currently a trusted terminal for the user. On the other hand, if they are not matched, it indicates that the login terminal is an untrusted terminal for the user, and the server can only record, for the untrusted terminal, hardware information of the terminal and the number of times that the user uses the terminal to log in.

When the server verifies the login terminal for the user, verifying can still be performed according to login information of the user, such as transaction information, an IP address, a login time period, or the like of the user. After the verifying is passed, the login terminal can be recorded locally as a trusted terminal of the user. In addition, the server may also classify, according to terminal types, trusted terminals that have been recorded locally.

For example, the server may classify, according to the terminal types and a frequent-use time period of the trusted terminal, the locally recorded trusted terminals into a handheld trusted terminal, a household trusted terminal, and an office trusted terminal. If the trusted terminal is a handheld terminal, the server may locally classify the trusted terminal as a handheld trusted terminal. If the trusted terminal is identified as a PC terminal, the server may further determine whether the frequent-use time period of the trusted terminal is an office time period or a household time period. If it is the household time period, the server may directly locally classify the trusted terminal as a household trusted terminal, and if it is the office time period, the server may locally classify the trusted terminal as an office trusted terminal.

The hardware information of the login terminal may include different information according to a different terminal type of the login terminal. For example, if the login terminal is a PC terminal, the hardware information may include a mainboard MAC, a network card MAC, an operating system and other information of the PC terminal. If the login terminal is a mobile phone terminal, the hardware information may include hardware information, a mobile phone system, and other information of the mobile phone terminal.

In step 102, there is a determination whether a login account of the user is associated with a frequent-use login account of the login terminal when it is determined that the login terminal does not match the locally recorded trusted terminal of the user;

In step 103, the login terminal is determined as the trusted terminal of the user, if the login account of the user is associated with the frequent-use login account of the login terminal.

In the above steps, when the login terminal of the user is a trusted terminal of the user recorded locally by the server, complicated repetitive verifying may not be performed on the login terminal or merely simple verification is performed. On the other hand, when the login terminal of the user is not the trusted terminal of the user recorded locally by the server, the server may further acquire a login account of the user and historical login accounts of the login terminal, determine whether the login account of the user is associated with the historical login accounts of the login terminal, and then determine whether the login terminal is the trusted terminal of the user.

For example, the server may identify a frequent-use login account from the acquired historical login accounts. For instance, in the historical login accounts, a login account that the number of logins thereof reaches a threshold can be used as a frequent-use login account. When the frequent-use login account is identified, the server may, by querying a local database, determine whether the frequent-use login account and the login account used in the current login of the user were logged-in on a same trusted terminal and whether the number of logins reaches the threshold. If the frequent-use login account and the login account used in the current login of the user were logged-in on the same trusted terminal and the number of logins reaches the threshold, it indicates that the login account used in the current login of the user is highly associated with the frequent-use login account of the login terminal, and the server can determine the login terminal as the trusted terminal of the user.

In some embodiments, during determining whether the frequent-use login account and the login account used in the current login of the user were logged-in on a same trusted terminal, the same trusted terminal may be a same household trusted terminal. When the frequent-use login account and the login account used in the current login of the user were logged-in on the same trusted terminal and the number of logins thereof reaches a threshold, the user and a user corresponding to the frequent-use login account may be in a family relationship. Thus, it may determine the login terminal as the trusted terminal of the user.

In some embodiments, the server may acquire frequent-use login accounts of household trusted terminals recorded locally respectively, and then establish family relationship data according to the acquired frequent-use login accounts. When a log-in user is being verified, whether the current log-in user and a user who frequently uses the login terminal are in a family relationship may be identified by querying the established family relationship data.

Generally, when it is determined that the frequent-use login account and the login account used in the current login of the user were logged-in on the same trusted terminal, the same trusted terminal may also be a same handheld trusted terminal or office trusted terminal.

In addition, before the server determines an association relationship between the above login accounts, the server may further screen the users to determine a frequent user of the login terminal, and the association relationship between the above login accounts is determined only for the frequent user.

For example, the server may also determine whether the number of logins of the login account of the user on the login terminal reaches a threshold. If the number of logins of the login account of the user on the login terminal reaches the threshold, it indicates that the user is a frequent user and it may further determine whether the login account of the user is associated with the frequent-use login account of the login terminal. If the number of logins of the login account of the user on the login terminal does not reach the threshold, it indicates that the user is not a frequent user, and it may determine the login terminal as an untrusted terminal of the user. In an example of the same trusted terminal being the same household trusted terminal, if the number of logins on the household trusted login terminal used by a user is less than the threshold (e.g., only once), the user may be merely a visitor. For such users, it is meaningless for the server to determine on the association relationship between the above login accounts, and thus it may determine the login terminal as an untrusted terminal of the user directly.

In this embodiment, during verifying the login terminal, the server determines an association relationship between a login account and a frequent-use login account of the login terminal, and when it is determined that the login account of the user is associated with the frequent-use login account of the login terminal, the server determines that the login terminal is a trusted terminal of the user.

By means of the above solution, in an application scenario where a login terminal is exchanged between users, whether the login terminal is a trusted terminal of the user can be determined through an association relationship between the login account of the user and the frequent-use login account of the login terminal, thereby avoiding performing complicated repetitive verifying on the login terminal.

Figure 2:
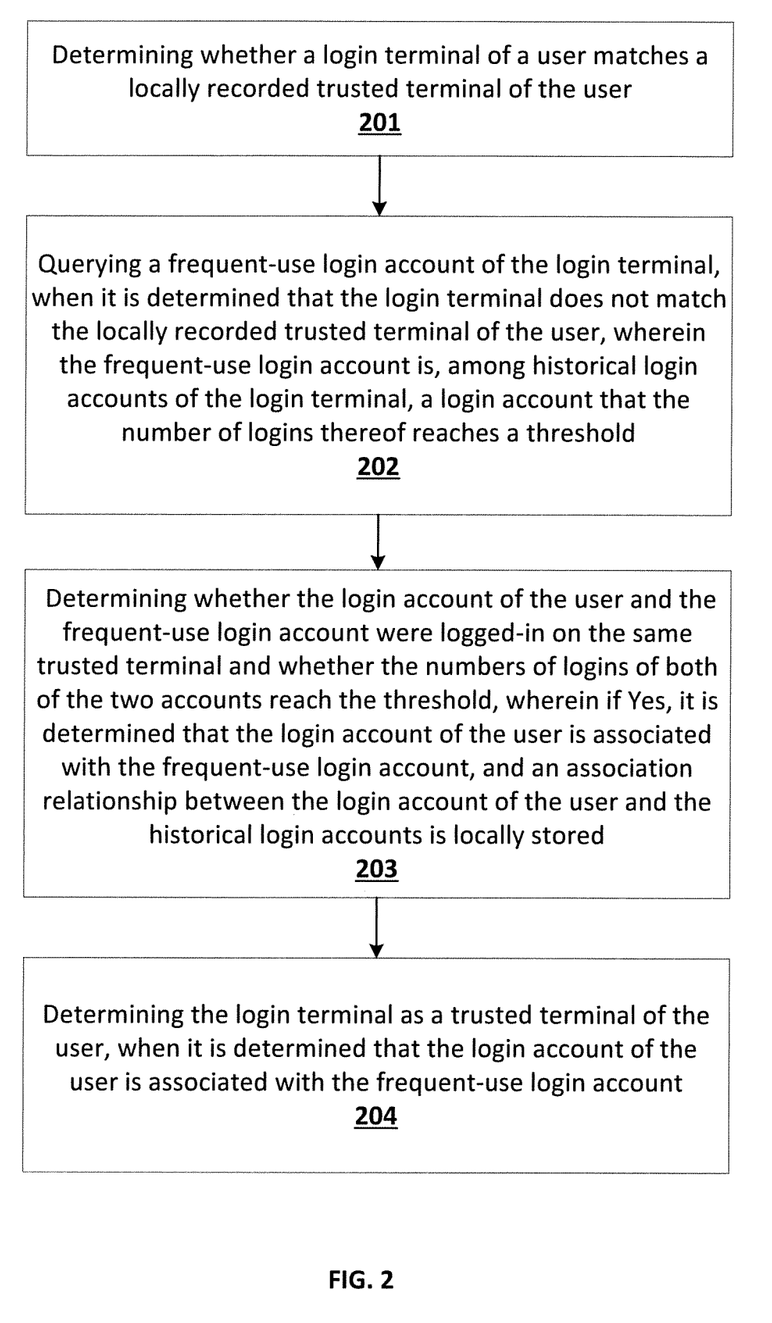
FIG. 2 is a flow chart of another method for verifying a trusted terminal, according to embodiments of the disclosure.

Referring to FIG. 2, FIG. 2 is a method for verifying a trusted terminal according to embodiments of the disclosure. The method may be performed by a server, and the method includes steps 201-204 as below.

In step 201, a determination may be made whether a login terminal of a user matches a locally recorded trusted terminal of the user.

In step 202, when it is determined that the login terminal does not match the locally recorded trusted terminal of the user, a frequent-use login account of the login terminal is queried, wherein the frequent-use login account is, among historical login accounts of the login terminal, a login account that the number of logins thereof reaches a threshold.

In step 203, whether the login account of the user and the frequent-use login account were logged-in on the same trusted terminal and whether the numbers of logins of both of the two accounts reach the threshold may be determined. If the login account of the user and the frequent-use login account were logged-in on the same trusted terminal and the numbers of logins of both of the two accounts reach the threshold, it is determined that the login account of the user is associated with the frequent-use login account, and an association relationship between the login account of the user and the historical login accounts is locally stored.

In step 204, when it is determined that the login account of the user is associated with the frequent-use login account, the login terminal is determined as a trusted terminal of the user.

In this embodiment, during determining whether the login terminal of the user is a trusted terminal of the user, the server may acquire hardware information of the login terminal and then sequentially match the hardware information of the terminal with hardware information of the trusted terminal of the user recorded in a database. If they are matched, it indicates that the login terminal is currently a trusted terminal for the user. On the other hand, if they are not matched, it indicates that the login terminal is an untrusted terminal for the user. The server may merely record, for the untrusted terminal, hardware information of the terminal and the number of times that the user uses the terminal to log in.

When the server verifies the login terminal for the user, verifying can still be performed according to current solutions for verifying login terminals of a user. For example, the server may verify login terminals of a user according to login information of the user, such as transaction information, an IP address, a login time period, or the like of the user. After the verifying is passed, the login terminal can be recorded locally as a trusted terminal of the user.

During implementation, the server may divide a local authentication system into different sub-systems. The different sub-systems cooperate with each other to accomplish the above process of verifying a login terminal of a user.

Figure 3:
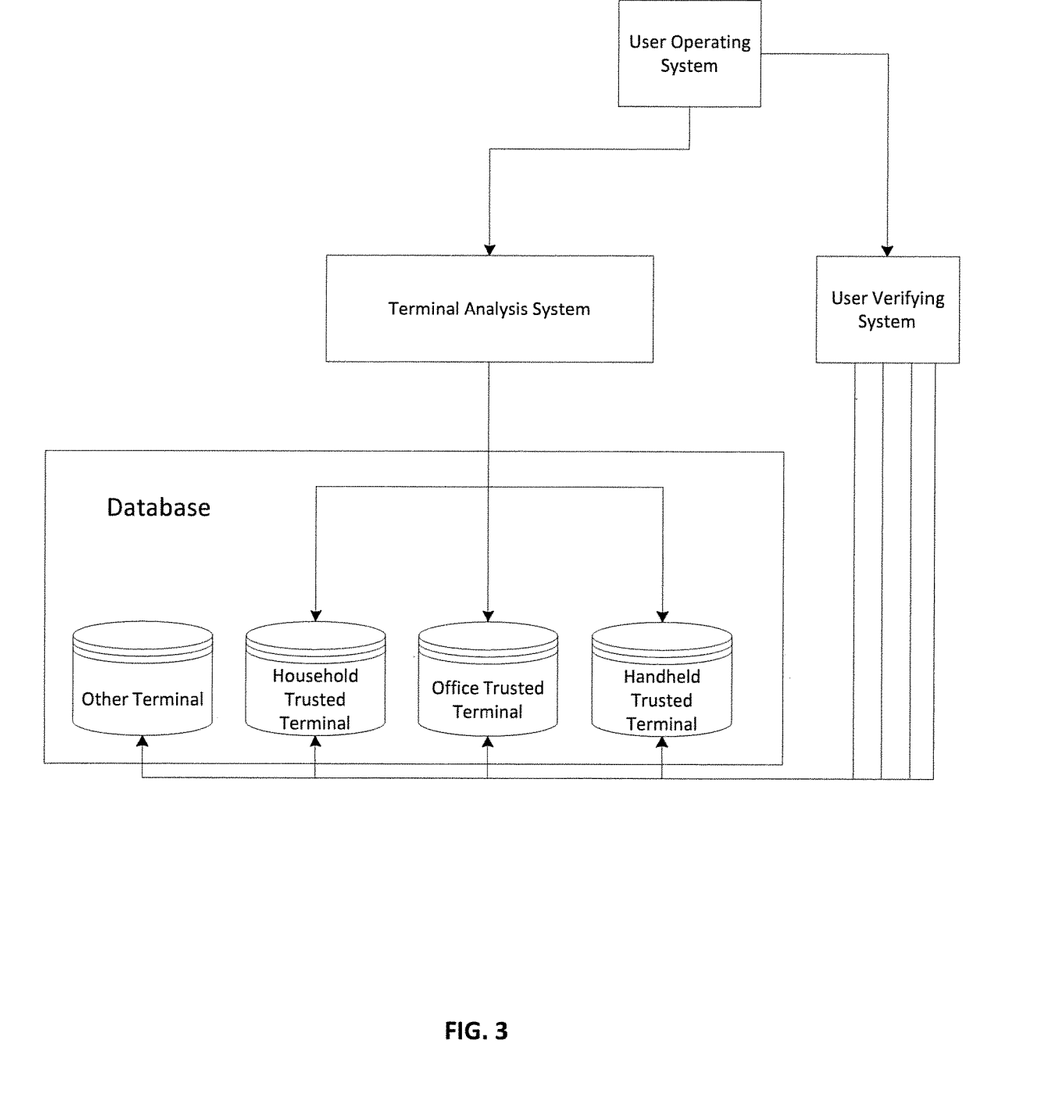
FIG. 3 is a schematic diagram of verifying a login terminal of a user by a server, according to embodiments of the disclosure.

For example, with reference to FIG. 3, sub-systems after an verifying system of a server being divided may include a user operating system, a user verifying system, and a terminal analysis system. It should be noted that the above dividing of sub-systems of the verifying system of the server is merely exemplary, and is not used to limit the present disclosure.

1) User Operating System

The user operating system is used for recording user operations, such as a user logging into the Alipay system, logging out, transferring, modifying user information, the number of logins and other operations, and storing the recorded user operations into a database. The user operating system is further used for acquiring an operating environment of the user, such as hardware information of the login terminal of the user, and transmitting the acquired hardware information of the login terminal of the user to the terminal analysis system for analysis.

For example, the user operating system may analyze the operating environment of the user during user operations, acquire hardware information of the login terminal of the user, perform modeling according to the acquired hardware information, and transmit a hardware information model generated by modeling to the terminal analysis system for analysis. The hardware information of the login terminal may include different information according to different terminal types of the login terminal. For example, if the login terminal is a PC terminal, the hardware information may include a mainboard MAC, a network card MAC, an operating system and other information of the PC terminal.

If the login terminal is a mobile phone terminal, the hardware information may include hardware information, a mobile phone system and other information of the mobile phone terminal.

2) Terminal Analysis System

The terminal analysis system is used for analyzing the login terminal of the user according to the hardware information model transmitted from the user operating system, verifying the login terminal of the user according to an analysis result, and storing a verified trusted terminal of the user in a database. Meanwhile, the terminal analysis system may also classify, according to the terminal types, the trusted terminals recorded in the database.

Figure 4:
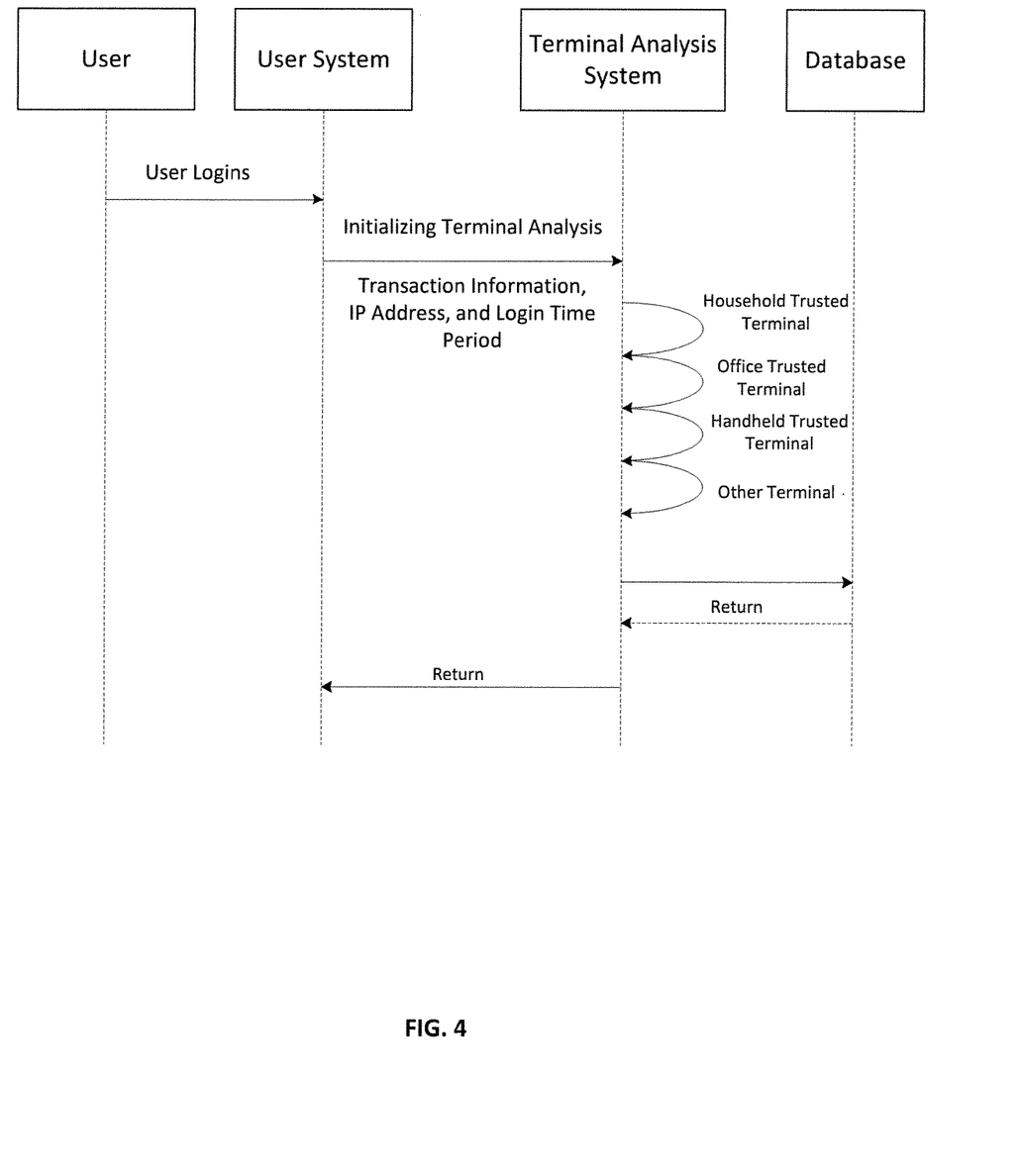
FIG. 4 is a flow chart of processing of a terminal analysis system, according to embodiments of the disclosure.

For example, with reference to FIG. 3 and FIG. 4, the terminal analysis system may still analyze the login terminal according to login information of the user, such as transaction information, an IP address, a login time period, or the like of the user, and verify the login terminal of the user according to an analysis result. After the verifying is passed, the login terminal may be recorded locally as a trusted terminal of the user in a local database. Trusted terminals recorded in the database may be further classified by the terminal analysis system according to terminal types into a handheld trusted terminal, a household trusted terminal, and an office trusted terminal.

For example, if the trusted terminal is identified as a handheld terminal according to the hardware information, the terminal analysis system may locally classify the trusted terminal as a handheld trusted terminal. If the trusted terminal is identified as a PC terminal according to the hardware information, the terminal analysis system may further determine whether a frequent-use time period of the trusted terminal is an office time period or a household time period. If it is the household time period, the terminal analysis system may locally classify the trusted terminal as a household trusted terminal, and if it is the office time period, the terminal analysis system may locally classify the trusted terminal as an office trusted terminal.

For a login terminal that belongs to none of the household trusted terminal, the office trusted terminal, and the handheld trusted terminal, the login terminal may be locally classified as the other terminal. The other terminal is not a trusted terminal yet, and thus may not be stored in the database.

3) User Verifying System

The user verifying system is used for invoking the database, and verifying the login terminal of the user.

For example, the user verifying system may invoke the database, and match hardware information of the login terminal of the user with hardware information of the trusted terminal of the user recorded in the database. If corresponding information is matched, it can be determined that the login terminal is a trusted terminal of the user, and when the user logs in, repetitive verifying may not be performed on the login terminal or merely simple verification may be performed.

Figure 5:
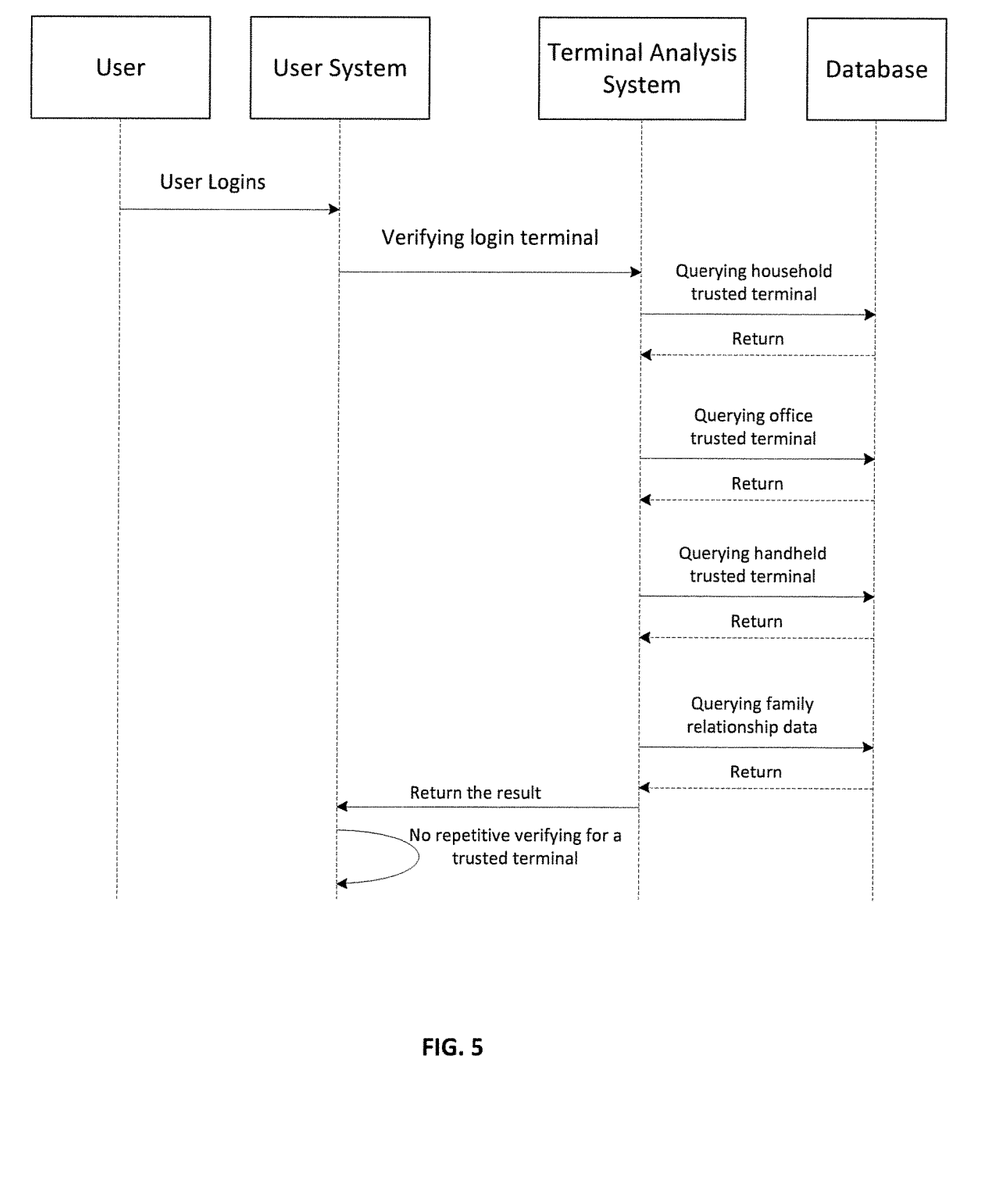
FIG. 5 is a flow chart of processing of a user verifying system, according to embodiments of the disclosure.

Referring to FIG. 5, if no information is matched, it can be further determined whether the login terminal is matched with the another terminal recorded by the terminal analysis system. If the login terminal is identified as the another terminal recorded in the terminal analysis system, the user verifying system may further invoke the database, acquire a login account of the user and historical login accounts of the login terminal, and determine whether the login terminal is a trusted terminal of the user by determining whether the login account of the user is associated with the historical login accounts of the login terminal.

For example, the user verifying system may use, among historical login accounts, a login account that the number of logins thereof reaches a threshold as a frequent-use login account, query a database to determine whether the frequent-use login account and a login account used in the current login of the user were logged-in on a same trusted terminal and whether the number of logins thereof reaches the threshold. If the frequent-use login account and the login account used in the current login of the user were logged-in on the same trusted terminal and the number of logins thereof reaches the threshold, it indicates that the login account used in the current login of the user is highly associated with the frequent-use login account of the login terminal, and then the server may determine that the login terminal is the trusted terminal of the user. When the user performs a sensitive operation after logging into the terminal, repetitive verifying may not be performed on the user or merely simple verification is performed.

In some embodiments, during determining whether the frequent-use login account and the login account used in the current login of the user were logged-in on the same trusted terminal, the same trusted terminal may be the same household trusted terminal.

When the frequent-use login account and the login account used in the current login of the user were logged-in on the same trusted terminal and the number of logins reaches a threshold, the user and a user corresponding to the frequent-use login account may be in a family relationship. Thus, it may be determined by the user verifying system that the login terminal is the trusted terminal of the user.

In some embodiments, when whether the user and a user corresponding to the frequent-use login account are in a family relationship is being determined, the user verifying system may query the database for frequent-use login accounts of household trusted terminals respectively, and then establish family relationship data according to the acquired frequent-use login accounts. When a log-in user is being verified, whether the current log-in user and a user who frequently uses the login terminal are in a family relationship may be determined by querying the established family relationship data.

In addition, when whether the frequent-use login account and the login account of the user were logged-in on the same trusted terminal is being determined, the same trusted terminal may also be the same handheld trusted terminal or office trusted terminal. When it is determined that the frequent-use login account and the login account of the user were logged-in on the same handheld trusted terminal or office trusted terminal, the user verifying system may notify the terminal analysis system, record the login terminal as a trusted terminal of the user into a database, and classify, in the database, the terminal as a handheld trusted terminal or an office trusted terminal, description of which will be omitted herein.

It can be known from the above embodiments that, in a process of verifying the login terminal, the server determines an association relationship between a login account and a frequent-use login account of the login terminal. When it is determined that the login account of the user is associated with the frequent-use login account of the login terminal, the login terminal is determined as a trusted terminal of the user.

By means of the above solution, in an application scenario where a login terminal is exchanged between users, whether the login terminal is a trusted terminal of the user can be determined through an association relationship between the login account of the user and the frequent-use login account of the login terminal, thereby avoiding performing complicated repetitive verifying on the login terminal In another optional embodiment, on the basis of the above embodiments, before the server determines an association relationship between login accounts as described above, the server may further screen the users to determine a frequent user of the login terminal, and the association between the above login accounts is determined only for the frequent user.

For example, the user verifying system may also determine whether the number of logins of the login account of the user on the login terminal reaches a threshold. If the number of logins of the login account of the user on the login terminal reaches the threshold, it indicates that the user is a frequent user and it may further determine whether the login account of the user is associated with the frequent-use login account of the login terminal. If the login account of the user is not associated with the frequent-use login account of the login terminal, it indicates that the user is not a frequent user, and it may determine the login terminal as an untrusted terminal of the user.

In an example of the same trusted terminal being the same household trusted terminal, if the number of logins on the household trusted login terminal used by a user is less than the threshold (e.g., only once), the user may be merely a visitor. For such users, it is meaningless for the server to determine on the association relationship between the above login accounts, and thus it may determine the login terminal as an untrusted terminal of the user directly.

In an example of the same trusted terminal being the same household trusted terminal, if the number of logins on the household trusted login terminal used by a certain user is less than the threshold (e.g., only once), the user may be merely a visitor. For such users, it is meaningless for the user verifying system to determine on the association relationship between the above login accounts, and thus the user verifying system may directly determine that the login terminal is an untrusted terminal of the user.

Figure 6:
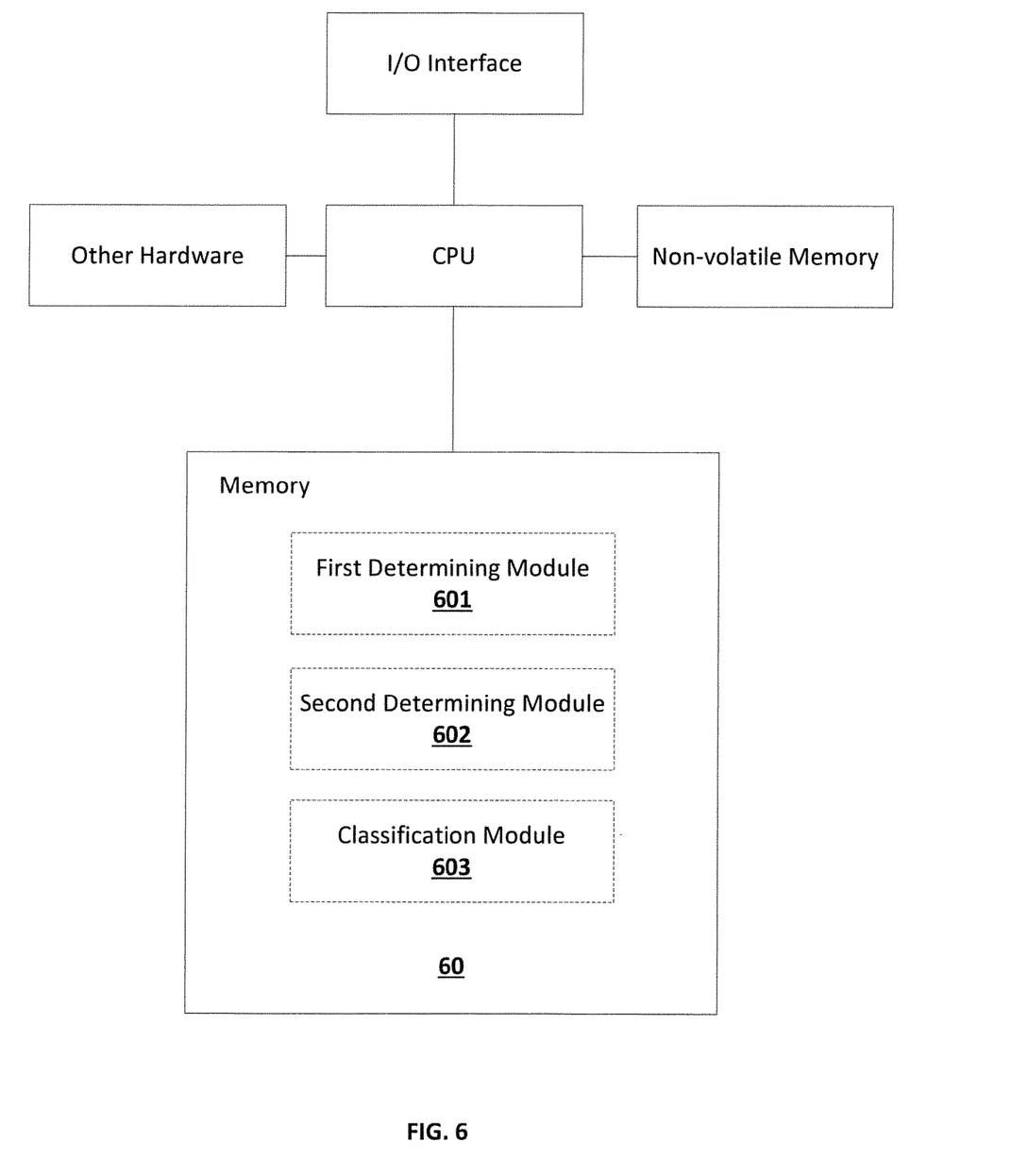
FIG. 6 is a schematic diagram of a logical structure of a trusted terminal verifying device, according to embodiments of the disclosure.

Corresponding to the above method embodiments, the present disclosure further provides an embodiment of a trusted terminal verifying device. In an example of implementing the embodiment by software, the device may be operated on a server, and as a running entity of the device of the present disclosure, generally, the server at least includes a CPU, a memory, and a non-volatile memory, and may further include an I/O interface and the like. Referring to FIG. 6, FIG. 6 is a schematic diagram of a logical structure of a trusted terminal verifying device 60 according to an exemplary embodiment of the present disclosure, and device 60 may include: a first determining module 601 and a second determining module 602.

First determining module 601 may be used for determining whether a login terminal of a user matches a trusted terminal recorded locally.

Second determining module 602 may be used for determining, when it is determined that the login terminal does not match the trusted terminal recorded locally, whether a login account of the user is associated with a frequent-use login account of the login terminal, and determining that the login terminal is the trusted terminal of the user if the login account of the user is associated with the frequent-use login account of the login terminal.

In this embodiment, device 60 further includes: a classification module 603, used for identifying, before first determining module 601 determines whether a login terminal of a user matches a trusted terminal of the user recorded locally, a terminal type of the trusted terminal according to hardware information of the trusted terminal; locally classifying the trusted terminal as a handheld trusted terminal when the trusted terminal is identified as a handheld terminal; determining whether a frequent-use time period of the trusted terminal is an office time period or a household time period when the trusted terminal is identified as a PC terminal; locally classifying the trusted terminal as an office trusted terminal when the frequent-use time period of the trusted terminal is the office time period; and locally classifying the trusted terminal as a household trusted terminal when the frequent-use time period of the trusted terminal is the household time period.

In this embodiment, second determining module 602 may be further used for: determining, before determining whether a login account of the user is associated with a frequent-use login account of the login terminal, whether the number of logins of the login account of the user on the login terminal reaches a threshold; if the number of logins of the login account of the user on the login terminal reaches the threshold, further determining whether the login account of the user is associated with the frequent-use login account of the login terminal; and if the number of logins of the login account of the user on the login terminal does not reach the threshold, determining the login terminal as an untrusted terminal of the user.

In this embodiment, second determining module 602 may be further used for: querying the frequent-use login account of the login terminal, wherein the frequent-use login account is, among historical login accounts of the login terminal, a login account that the number of logins thereof reaches a threshold; determining whether the login account of the user and the frequent-use login account were logged-in on the same trusted terminal and whether the numbers of logins of both of the two accounts reach the threshold; and if the login account of the user and the frequent-use login account were logged-in on the same trusted terminal and the numbers of logins of both of the two accounts reach the threshold, determining that the login account of the user is associated with the frequent-use login account, and locally storing an association relationship between the login account of the user and the historical login accounts.

In this embodiment, the same trusted terminal is the same household trusted terminal.

For the device embodiments, as it is basically corresponding to the method embodiments, reference can be made to the description in the method embodiments. The device embodiments described above are merely illustrative, wherein the modules described as separate components may or may not be physically separated, and the components displayed as modules may or may not be physical modules (e.g., they may be located in the same place, or may also be distributed onto a plurality of network modules). Some or all modules therein can be selected according to actual needs to achieve the objective of the solution of the present disclosure. Those of ordinary skill in the art can understand and implement it without making inventive efforts.

The above descriptions are merely embodiments of the present disclosure, and are not limiting the present disclosure. Any modification, equivalent replacement, improvement and the like made within the spirit and principle of the present disclosure should fall within the scope of the present disclosure.

The present disclosure further provides an embodiment of a server.

The server includes: a processor; and a memory used for storing instructions executable by the processor.

Further, the server may further include an input/output interface, a network interface, various hardware, and the like.

The server may be used for determining whether a login terminal of a user matches a trusted terminal of the user recorded locally; determining, when it is determined that the login terminal does not match the trusted terminal of the user recorded locally, whether a login account of the user is associated with a frequent-use login account of the login terminal; and determining that the login terminal is the trusted terminal of the user if the login account of the user is associated with a frequent-use login account of the login terminal.

Those skilled in the art can easily derive other embodiments of the present application after considering and practicing the above disclosure. The present disclosure is aimed at covering any variations, use or adaptive changes of the present disclosure, and the variations, use or adaptive changes conform to the general principle of the present disclosure and include common knowledge or common technical means in the technical field not disclosed in the present disclosure. The specification and embodiments are merely regarded as exemplary, and the scope and spirit of the present disclosure are defined by the accompanied claims.

It should be understood that the present disclosure is not limited to the accurate structure described above and illustrated in the drawings, and various modifications and changes can be made without departing from the scope thereof. The scope of the present disclosure is only limited by the appended claims.

What is claimed is:

1. A method for verifying trust of a login terminal, comprising:
   receiving a login request, from the login terminal, to access a first user account;
   determining whether the login terminal is trusted by the first user account;
   responsive to determining that the login terminal is not trusted by the first user account:
      determining whether the first user account is associated with a second user account that trusts the login terminal, wherein the determining comprising:
         determining whether the first user account was logged-in on a second login terminal a first threshold number of times; and
         responsive to determining the first user account has logged on to the second login terminal the first threshold number of times:
            determining that the second login terminal is trusted by the first user account;
            determining whether the second user account has logged on to the second login terminal a second threshold number of times; and
            responsive to determining that the second user account has logged on to the second login terminal a second threshold number of times,
               determining that the second login terminal is trusted by the second user account and associating the first user account with the second user account; and
         in response to associating the first user account with the second user account that trusts the login terminal,
            granting access, after the login request is authenticated, to the first user account.

2. The method according to claim 1, wherein before determining whether the login terminal is trusted by the first user account, the method further comprises:
   identifying a terminal type of the login terminal according to hardware information of the trusted terminal, wherein the terminal type is:
   a handheld terminal when the login terminal is identified as a handheld device;
   an office terminal when the login terminal is identified as a desktop device frequently used during an office time period; and
   a household terminal when the login terminal is identified as a desktop device frequently used during a household time period.

3. The method according to claim 1, wherein determining whether the first user account is associated with the second user account that trusts the login terminal comprises:
   determining whether the first user account and the second user account were logged-in on a second login terminal a third threshold number of times, wherein the second login terminal was trusted by both the first user account and the second user account; and
   responsive to determining the first user account and the second user account were logged-in on the second login terminal the third threshold number of times:
      determining that the first user account is associated with the second user account, and
      recording the association between the first user account and the second user account.

4. The method according to claim 3, wherein the second login terminal is a household terminal.

5. A system for verifying trust of a login terminal, comprising:
   a memory storing a set of instructions; and
   one or more processors configured to execute the set of instruction to cause the system to perform:
      receiving a login request, from the login terminal, to access a first user account;
      determining whether the login terminal is trusted by the first user account;
      responsive to determining that the login terminal is not trusted by the first user account:
         determining whether the first user account is associated with a second user account that trusts the login terminal, wherein the determining comprising:
            determining whether the first user account was logged-in on a second login terminal a first threshold number of times; and
            responsive to determining the first user account has logged on to the second login terminal the first threshold number of times:
               determining that the second login terminal is trusted by the first user account;
               determining whether the second user account has logged on to the second login terminal a second threshold number of times; and
               responsive to determining that the second user account has logged on to the second login terminal a second threshold number of times, determining that the second login terminal is trusted by the second user account and associating the first user account with the second user account; and in response to associating the first user account with the second user account that trusts the login terminal, granting access, after the login request is authenticated, to the first user account.

6. A non-transitory computer readable medium that stores a set of instructions that are executable by at least one processor of a computer system to cause the computer system to perform a method for verifying trust of a login terminal, the method comprising:

receiving a login request, from the login terminal, to access a first user account;

determining whether the login terminal is trusted by the first user account;

responsive to determining that the login terminal is not trusted by the first user account:

determining whether the first user account is associated with a second user account that trusts the login terminal, wherein the determining comprising:

determining whether the first user account was logged-in on a second login terminal a first threshold number of times;

responsive to determining the first user account has logged on to the second login terminal the first threshold number of times:

determining that the second login terminal is trusted by the first user account;

determining whether the second user account has logged on to the second login terminal a second threshold number of times; and responsive to determining that the second user account has logged on to the second login terminal a second threshold number of times, determining that the second login terminal is trusted by the second user account and associating the first user account with the second user account; and in response to associating the first user account with the second user account that trusts the login terminal, granting access, after the login request is authenticated, to the first user account.

7. The non-transitory computer readable medium according to claim 6, further comprising:

identifying, before determining whether the login terminal is trusted by the first user account, a terminal type of the login terminal according to hardware information of the trusted terminal, wherein the terminal type is:

a handheld terminal when the login terminal is identified as a handheld device;

an office terminal when the login terminal is identified as a desktop device frequently used during an office time period; and a household terminal when the login terminal is identified as a desktop device frequently used during a household time period.

8. The non-transitory computer readable medium according to claim 6, wherein determining whether the first user account is associated with the second user account that trusts the login terminal comprises:

determining whether the first user account and the second user account were logged-in on a second login terminal a third threshold number of times, wherein the second login terminal was trusted by both the first user account and the second user account; and responsive to determining the first user account and the second user account were logged-in on the second login terminal the third threshold number of times:

determining that the first user account is associated with the second user account, and recording the association between the first user account and the second user account.

9. The non-transitory computer readable medium according to claim 8, wherein the second login terminal is a household terminal.

10. The system according to claim 5, wherein the one or more processors are configured to execute the set of instructions to cause the system to, before determining whether the login terminal is trusted by the first user account, further perform:

identifying a terminal type of the login terminal according to hardware information of the trusted terminal, wherein the terminal type is:

a handheld terminal when the login terminal is identified as a handheld device;

an office terminal when the login terminal is identified as a desktop device frequently used during an office time period; and a household terminal when the login terminal is identified as a desktop device frequently used during a household time period.

11. The system according to claim 5, wherein determining whether the first user account is associated with the second user account that trusts the login terminal comprises:

determining whether the first user account and the second user account were logged-in on a second login terminal a third threshold number of times, wherein the second login terminal was trusted by both the first user account and the second user account; and responsive to determining the first user account and the second user account were logged-in on the second login terminal the third threshold number of times:

determining that the first user account is associated with the second user account, and recording the association between the first user account and second user account.

12. The system according to claim 11, wherein the second login terminal is a household terminal.

* * * * *